UNITED STATES PATENT OFFICE.

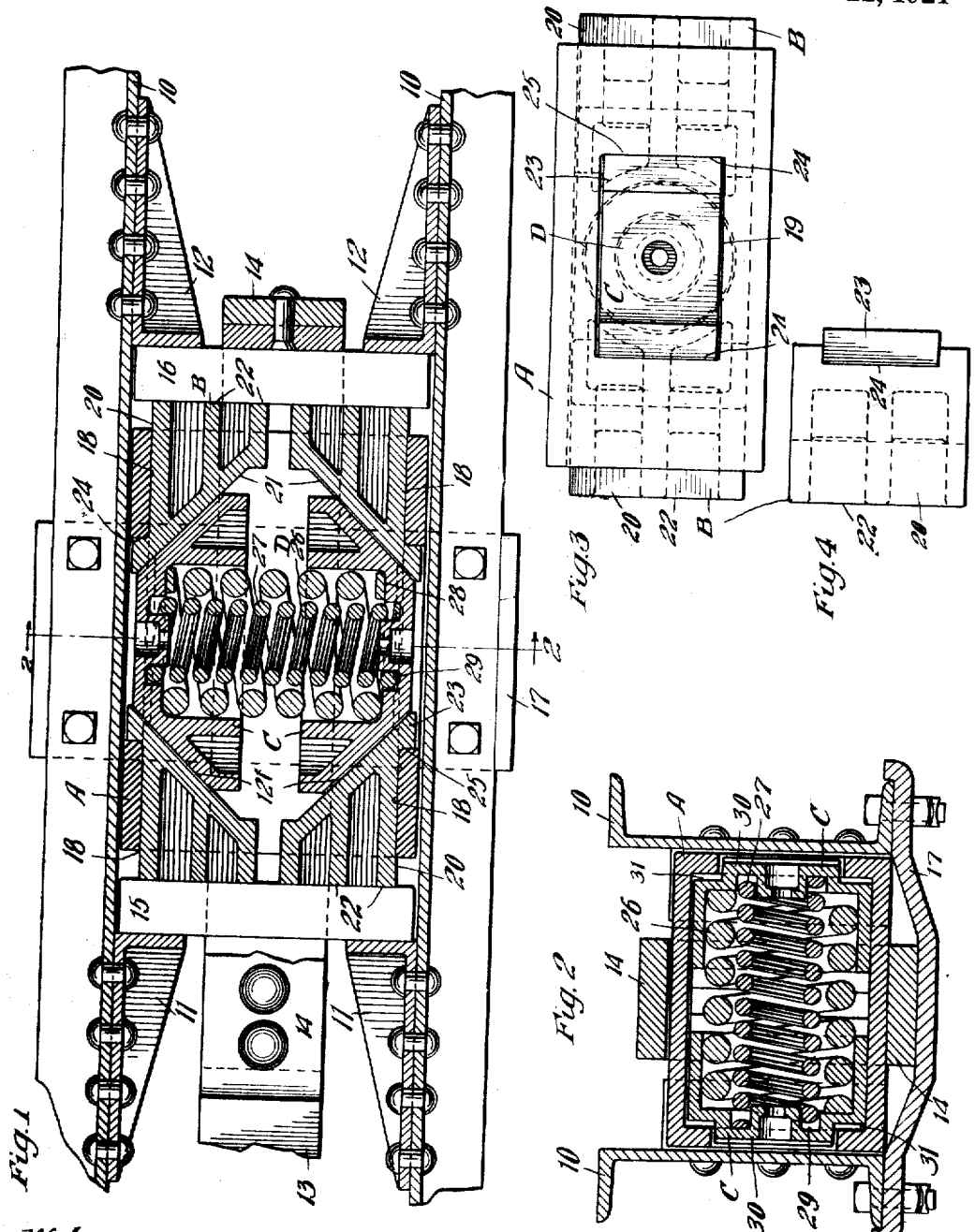

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,398,037.    Specification of Letters Patent.    Patented Nov. 22, 1921.

Application filed April 21, 1920, Serial No. 375,462. Renewed October 3, 1921. Serial No. 505,116.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide an efficient friction shock absorbing mechanism especially adapted for railway draft riggings and wherein the shock absorbing mechanism proper comprises relatively few parts, the parts being self-locked when assembled and, in action, providing large frictional wearing areas.

More specifically, the object of the invention is to provide a friction shock absorbing mechanism wherein is employed a transversely extending spring, a friction shell with which coöperate end sets of independent wedges, laterally movable friction shoes, the parts being so arranged that provision is made for automatically taking up wear and wherein also the maximum length of transverse spring is possible.

In the drawing forming a part of this specification, Figure 1 is a horizontal sectional view of a portion of a railway draft rigging showing my improvements in connection therewith. Fig. 2 is a vertical transverse sectional view taken substantially on the line 2—2 of Fig. 1. Fig. 3 is a side elevational view of the shock absorbing mechanism proper shown in Fig. 1. And Fig. 4 is an elevation view of one of the combined friction shoes and wedges.

In said drawing 10—10 denote channel-shaped center or draft sills of a railway car, to the inner faces of which are secured front stop lugs 11 and rear stop lugs 12. A portion of a drawbar shank is indicated at 13, the same having secured thereto a yoke 14 of well known form within which are included a front follower 15 and a rear follower 16. All of the parts may be supported by a detachable saddle plate 17.

The shock absorbing mechanism proper, as shown, comprises a substantially rectangular casting A; four combined wedges and shoes B; laterally movable friction shoes C; and a transversely extending spring D.

The casting A is of substantially hollow rectangular box-like form and is provided at each end thereof with a pair of opposed longitudinally extending friction surfaces 18—18. On each side, the casting A is cut away to provide a rectangular opening as indicated at 19 in Fig. 3. With this construction, it is evident that the casting A provides a double-ended friction shell, the shells being cast integrally.

Each of the combined friction shoes and wedges B is provided with an outer longitudinally extending friction surface 20 and an inclined inner friction wedge surface 21. Each of said members B is preferably in the form of a casting suitably cored to save metal as clearly indicated in Figs. 1 and 4 and the outer end thereof is left flat as indicated at 22 in Fig. 4 so as to adapt it to bear properly on the corresponding adjacent follower. In addition, each member B is provided at its inner end on the outer side thereof with an outwardly extending substantially rectangular lug 23 providing a transversely extending shoulder 24 which is adapted to coöperate with a corresponding opposed transverse edge 25 at the end of the opening 19. With this construction, when the parts are assembled, it is evident that the end wedges B are limited in their outward movement with respect to the friction shell and hence the over-all length of the device is positively maintained, without the necessity of any bolts or other additional structures.

The friction shoes C are provided at their ends with inclined friction surfaces 121 adapted to coöperate with the opposed friction surfaces 21 of the members B. Each shoe C is furthermore recessed on its interior so as to form a seat or pocket for the spring D. The spring D preferably comprises an outer heavy coil 26 and an inner lighter nested coil 27. A substantial bearing for the heavy coil 26 is formed in the shoe C as indicated at 28 and the end of the inner coil 27 seats in an annular groove 29. It will be noted that the outer portions 30 of the shoes C extend into the openings 19 but the shoes C are initially spaced from the side walls of the casting A as indicated by the space 31 in Fig. 2. With this construction, two important results are obtained, one being that the maximum space is obtained for the spring transversely of the friction shell, thereby, enabling the use of longer springs or springs having greater compression and the other result resides in the fact that, as wear occurs on the various friction surfaces, the shoes C will automatically compensate for such wear by gradually working outwardly to take up the space 31.

In assembling the shock absorbing mechanism, one end set of wedges B is inserted and then the shoes C with the spring D therebetween. The other set of end wedges B is then finally inserted, the same being forced inwardly until the lugs 23 thereof slip into the openings 19 after which the parts will remain in assembled position.

With the construction shown, it is evident that I obtain large wearing areas between the four sets of surfaces 18 and 20 and also between the four sets of surfaces 21 and 121. All parts may be manufactured in the form of castings at a comparatively small expense and all coöperating friction surfaces are plain or flat, thus facilitating fitting of the parts.

In actual practice, the lengths of the shoes C and the shoulders at the outer ends of the surfaces 21 of the members B will be so designed that they will come into engagement with each other at the end of the compressive stroke simultaneously with the outer ends of the elements B becoming flush with the ends of the casting A and the opposed faces of the shoes C also coming into contact with each other. With this arrangement, it will be seen that, at the end of the compressive stroke, I will obtain what amounts to a practically solid column so that the device is exceptionally well adapted to withstand the enormous blows of service.

Although I have herein shown and described what I now consider the preferred manner of carrying out the invention, the same is merely illustrative and I contemplate all changes and modifications that come within the scope of the claims appended hereto.

I claim:

1. In a friction shock absorbing mechanism, the combination with a shell casting provided with interior longitudinally extending friction surfaces; of wedge-shoes having outer longitudinally extending friction surfaces coöperable with said shell friction surfaces, said wedge-shoes having also inclined friction wedge faces at their inner ends; means limiting the outward movement of said wedge-shoes with respect to said shell casting; friction shoes proper within the shell casting and movable transversely of the axis of the shell casting, said friction shoes proper having inclined end friction faces coöperable with said inclined friction wedge faces, there being an unoccupied space between the outermost side portions of said friction shoes proper and the shell casting in normal position of the parts as originally assembled whereby, upon wear of the friction surfaces, the normal position of the friction shoes proper may gradually move outwardly to thereby compensate for wear while the over-all length of the mechanism remains constant; and spring means between the friction shoes proper compressible upon lateral approach thereof.

2. In a friction shock absorbing mechanism, the combination with a friction shell having openings in the walls thereof and interior longitudinally extending friction surfaces; of a pair of combined friction shoes and wedges slidably mounted within said friction shell, each wedge-shoe having an outer friction surface coöperable with a friction surface of the shell and also an inclined friction surface at its inner end, each wedge-shoe having also an outwardly extending flange at its inner end providing a shoulder, the flanges of the wedge-shoes extending within the wall openings of the shell and coöperating with the edges of the latter to limit the outward movements of the wedge-shoes with respect to the shell, laterally movable friction shoes within the shell, said shoes having wedge shaped ends coöperable with said wedge-shoes; and spring means interposed between the laterally movable shoes.

3. In a friction shock absorbing mechanism, the combination with a casting having a friction shell at each end thereof formed integrally, the surfaces of each shell extending longitudinally and the side walls of the casting being provided with openings; of a pair of independent combined friction shoes and wedges coöperable with each shell and extending normally outwardly therebeyond, each of said wedge-shoes having an outer friction surface coöperable with a friction surface of the shell and an inclined friction surface at its inner end, each of said wedge-shoes having also an outwardly extended flange at its inner end arranged to enter an opening of the casting and engaging against an edge thereof to thereby limit the outward movements of the wedge-shoes; laterally movable friction shoes within the shell and having wedge-shaped ends coöperable with said inclined surfaces of the wedge-shoes; and spring means interposed between the laterally movable friction shoes.

4. In a friction shock absorbing mechanism, the combination with a shell casting having openings in the walls thereof and provided with interior longitudinally extending friction surfaces; of friction shoes disposed within said shell casting movable at right angles to the axis of the shell, said friction shoes being centrally disposed with respect to the shell casting and having outer ends extending partly within said openings, said friction shoes being normally slightly spaced from adjacent parts of the shell casting; spring means interposed between said friction shoes; and wedge-shoes coöperable with said first named shoes and the shell, said wedge-shoes being movable longitudinally of the shell.

5. In a friction shock absorbing mechanism, the combination with a shell casting having openings in the walls thereof and provided with interior longitudinally extending friction surfaces; of friction shoes disposed within said shell casting movable at right angles to the axis of the shell, said friction shoes being centrally disposed with respect to the shell casting and having outer ends extending partly within said openings, said friction shoes being normally slightly spaced from adjacent parts of the shell casting; spring means interposed between said friction shoes; and wedge-shoes coöperable with said first named shoes and the shell, said wedge-shoes being movable longitudinally of the shell, each of said wedge-shoes having a shouldered flange extending within one of said openings and adapted to engage an adjacent part of the shell casting to thereby limit the outward movements of the wedge-shoes with respect to the shell casting.

6. In a friction shock absorbing mechanism, the combination with a hollow substantially rectangular casting having a friction shell formed at each end thereof and integrally therewith, each of said shells having interior longitudinally extending friction surfaces, said casting having openings in the opposed side walls thereof; of a pair of independent wedge-shoes coöperable with each shell, said wedge-shoes normally extending outwardly beyond the end of the shell and each provided with a longitudinally extending friction surface coöperable with one of the friction surfaces of the shell, each of said wedge-shoes having also a flange at its inner end extending outwardly and movable within one of said openings; a pair of transversely movable friction shoes located within the casting and between the end sets of wedge-shoes, each of said friction shoes having wedge shaped ends, said friction shoes being normally slightly spaced from the side walls of the casting to adapt them to move outwardly within said openings for a limited distance to compensate for wear; and a coil spring interposed between said friction shoes.

In witness that I claim the foregoing I have hereunto subscribed my name this 5th day of Apr., 1920.

JOHN F. O'CONNOR.

Witness:
CARRIE GAILING.